United States Patent
Caditz

[19]

[11] Patent Number: 5,996,537
[45] Date of Patent: Dec. 7, 1999

[54] ALL PURPOSE PROTECTIVE CANINE COAT

[75] Inventor: Sylvan B. Caditz, Issaquah, Wash.

[73] Assignee: S. Caditz and Associates, Inc., Issaquah, Wash.

[21] Appl. No.: 08/963,958

[22] Filed: Nov. 4, 1997

Related U.S. Application Data

[63] Continuation-in-part of application No. 08/609,131, Feb. 29, 1996, abandoned, which is a continuation-in-part of application No. 29/038,032, Apr. 26, 1995, and application No. 29/038,029, Apr. 26, 1995.

[51] Int. Cl.⁶ .............................. A01K 13/00; B68C 5/00
[52] U.S. Cl. .............................................. 119/850; 54/79.1
[58] Field of Search ................................... 54/79.1, 79.2, 54/79.4; 119/850, 854

[56] References Cited

U.S. PATENT DOCUMENTS

| | | | |
|---|---|---|---|
| 312,880 | 2/1885 | McPherson | 54/79.2 |
| 1,293,521 | 2/1919 | O'Brien et al. | 54/79.2 |
| 2,131,495 | 9/1938 | Allen . | |
| 4,577,591 | 3/1986 | Wesseldine . | |
| 5,068,921 | 12/1991 | Jones . | |

FOREIGN PATENT DOCUMENTS

| | | |
|---|---|---|
| 245335 | 7/1963 | Australia . |
| 1029346 | 5/1966 | United Kingdom . |
| 2223390 | 4/1990 | United Kingdom . |

OTHER PUBLICATIONS

Companion Pet catalog excerpt, p. 53, Spring, date uncertain.
Campmore catalog excerpt, p. 81, Fall 1994.
Dog Outfitter catalog excerpt, p. 68, 1994.
Foster & Smith catalog excerpt, p. 97, date uncertain.
R.C. Steel catalog excerpt, p. 65, date uncertain.

*Primary Examiner*—Robert P. Swiatek
*Attorney, Agent, or Firm*—Christensen O'Connor; Johnson & Kindness PLLC

[57] ABSTRACT

An easily adaptable canine coat (10) for protecting the animal from harmful objects and various weather related factors. The coat includes a chest section (11) that secures to the animal by securing straps (14a–d) which pass over the animal's back and which provide protection for the animal's belly and chest. A cover (18) attaches to the straps and protects the animal's back. The cover is quickly and easily adjustable thus providing warming or cooling qualities. The cover is made of a highly reflective outer material for enhancing animal visibility during the day and night and keeping the animal cool by reflecting the sun. A hood (26) removably attaches to the cover and provides head protection.

17 Claims, 2 Drawing Sheets

ALL PURPOSE PROTECTIVE CANINE COAT

CROSS REFERENCE TO RELATED APPLICATIONS

The present application is a continuation-in-part of prior copending patent application Ser. No. 08/609,131, filed Feb. 29, 1996, now abandoned which is a continuation-in-part of copending patent applications Ser. Nos. 29/038,032, filed Apr. 26, 1995 and 29/038,029, filed Apr. 26, 1995.

FIELD OF THE INVENTION

This invention relates generally to a canine coat, and more particularly, to a protecting coat that provides additional day and night protection from various types of weather.

BACKGROUND OF THE INVENTION

Coats for canines have been around for many years. Existing coats provide protection from the weather, foreign objects or both. Coats range in function from cold weather wear for hairless or short-haired dogs to bulletproof vests for police dogs.

An example of a coat that protects against weather is Great Britain patent No. 1,029,346 to Gotschi et al. Gotschi et al. teach a canine coat that covers the chest and back of the canine, as shown in FIGS. 1–5. Essentially, Gotschi et al. teach a form fitted coat made of a flexible material designed to keep a dog warm in cold weather. Gotschi et al. fail to disclose a coat that provides adequate penetration protection as might be needed by hunting dogs. Also, Gotschi et al. have designed a canine coat to provide warmth in cold weather with no concern for dogs that may overheat due to exertion and heavy exposure to the sun.

Another product on the market effective in one form of protection is the Tummy Save®. As shown in Figure F, the Tummy Saver® protects a dog's chest and abdomen from cuts, scratches and skin irritations from heavy ground cover and unseen obstacles. A 1000-denier Cordura® patch and a Cordura® inner lining provides the protection of the Tummy Saver®. The Tummy Saver® is an effective product for abdominal protection. However, the Tummy Saver® is unconcerned with providing comfort in warm and cold weather.

The prior art described above fails to address the issue of providing day/night chest and belly protection that is adaptable between providing protection from overheating due to overexertion and heavy sun exposure and protection from cold weather.

SUMMARY OF THE INVENTION

In accordance with this invention, an adaptable four-legged animal coat is provided. The coat includes a cover and a chest pad with side portions for protecting the underside of the animal without significantly impairing leg movement. The straps are attached to the cover and the chest pad on a first side portion. A fastener strap is attached at one end to the cover. A first separable fastener associated with the other end of the fastener strap and a second side portion of the chest pad for securing the cover and the chest pad to the animal. A second separable fastener is associated with both side portions of the chest pad and the underside of the cover for further securing the cover to the chest pad In accordance with other aspects of this invention, the first and second separable fasteners are adjustable hook and loop fasteners that provide a comfortable fit around animals of various sizes and an easy method of donning and removing.

In accordance with yet other aspects of this invention, an inner and outer lining of the chest pad and cover are selected according to the thermal protection desired for the animal. The cover is made of a highly reflective outer material for enhancing animal visibility during the day and night and keeping the animal cool by reflecting the sun.

In accordance with still other aspects of this invention, the chest pad is made of a durable protective material to protect against ground clutter and the like.

In accordance with still yet other aspects of this invention, the cover is loosely fitted at a first securing position of the second separable fasteners with a highly reflective outer material for reflecting the sun and keeping the animal cool.

In accordance with further aspects of this invention, the cover is snugly fitted at a second securing position of the second separable fasteners and is made of a sun-absorbing, heat-containing material for keeping the animal warm.

In accordance with still further aspects of this invention, a hood attaches to he cover and is secured by straps under the animal's head for providing protection to he animal's head.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
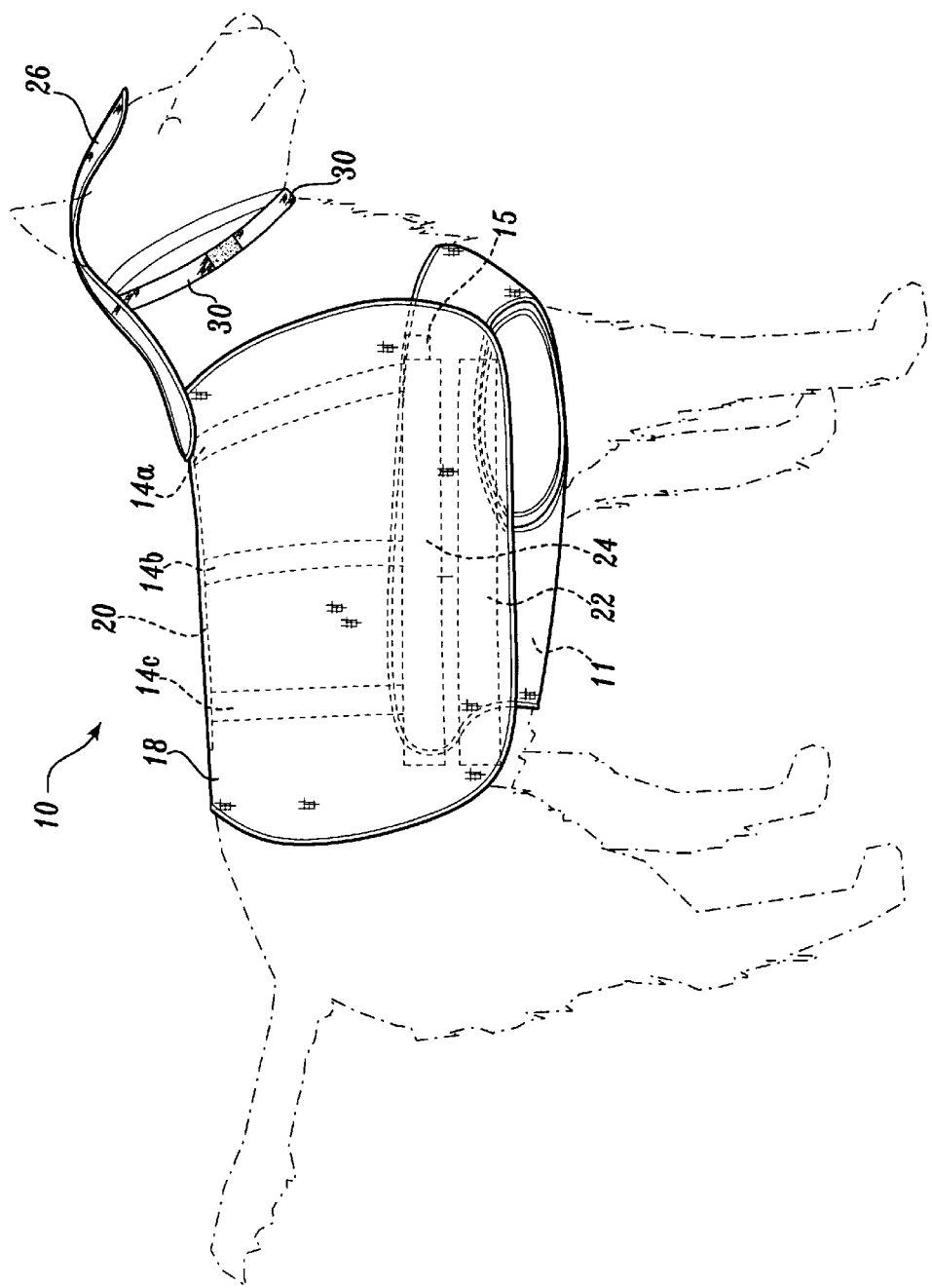
FIG. 1 is a schematic diagram of the coat of the present invention worn on a dog shown in phantom.
Figure 2:
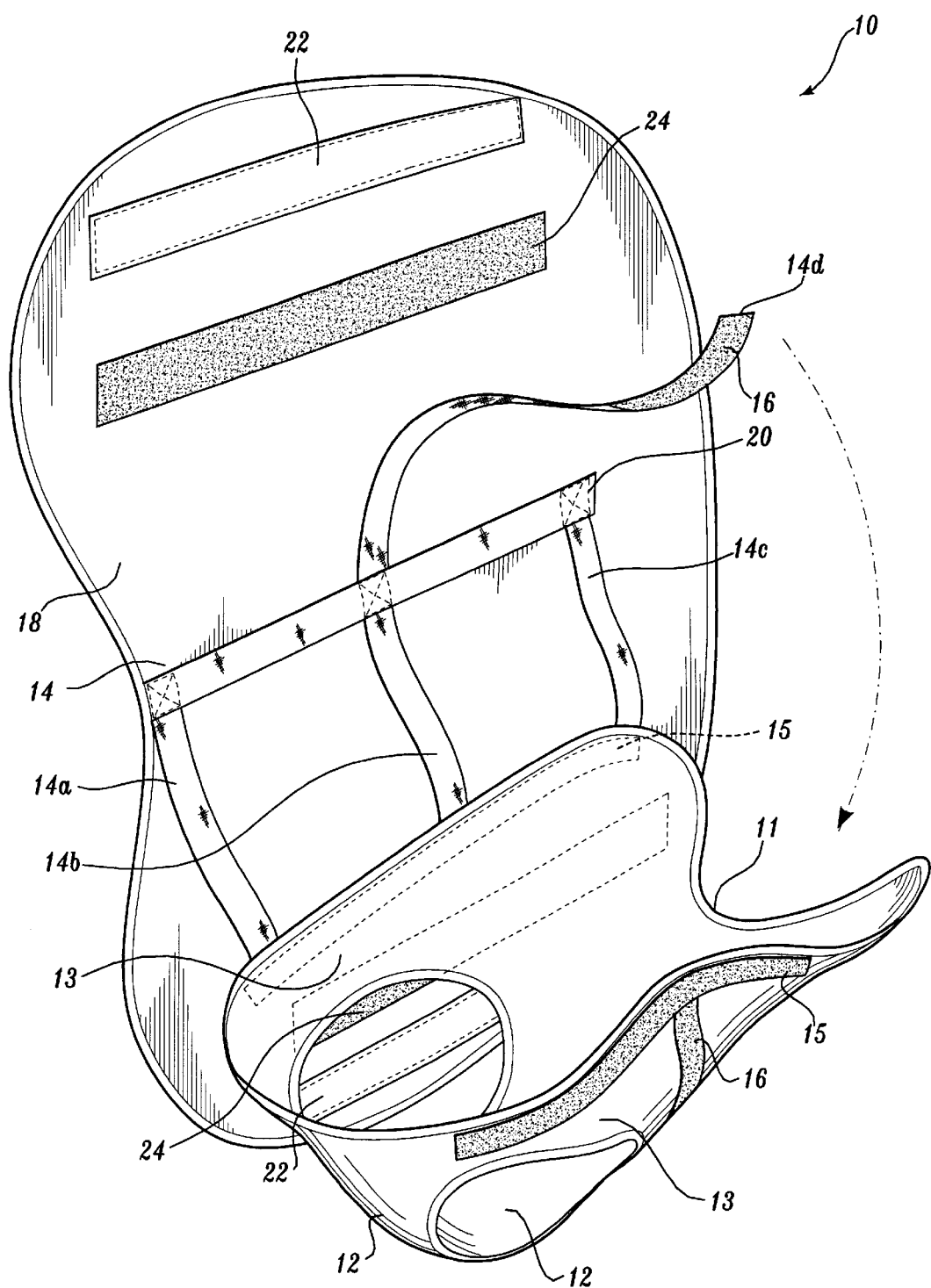
FIG. 2 is a perspective exploded diagram of the cover and attached chest sections.

A first embodiment of the present invention is illustrated in FIGS. 1 and 2. The weather-adaptable protective canine coat 10 includes a chest section 11, securing straps 14, lengthwise fasteners 15, and a cover 18. The chest section 11 is a one piece unit which includes a belly portion 12 and first and second side portions 13.

As shown in FIGS. 1 and 2, the belly portion 12 has a forward chest end with sufficient amount of material for protecting the canine's chest and lower neck area, and a mid and rear abdominal end shaped to cover the dog's abdomen while providing unencumbered hind leg movement. The first and second side portions 13 span from the forward chest end to the mid and rear abdominal end, creating an opening for the dog's forward legs. Three securing straps 14a–c are permanently attached to the first side portion 13 of the chest section 11. The first securing strap 14a is sewn or otherwise attached to the forward end of the first side portion 13, a second securing strap 14b is sewn or otherwise attached slightly to the rear of the front leg opening in the chest section 11, and a third securing strap 14c is sewn or otherwise attached to the read end of the chest section 11. While three securing straps are illustrated, the number of securing straps may vary depending upon the size of the animal.

The dog's front legs insert into openings between the belly portion 12 and the side portions 13. Essentially, the chest section 11 is a single piece of material with two cut out holes for the legs. The three securing straps 14a–c extend from the first side portion 13 over one side of the canine to attach to the longitudinal center of the cover 18 by a permanently attached strip 20. The three securing straps 14a–c are permanently stitched to the first side portion 13, the cover 18 and strip 20. A fourth securing strap 14d is permanently stitched to the cover 18 and strip 20 at the same securing point as strap 14b. The opposite end of the securing strap 14d is selectively securable to the second side portion 13 by engaging mating hook and loop fastener strips 16 (such as Velcro® fastener strips) that are sewn on the free end of strap 14d and the mating location on second side portion 13. Hook and loop fasteners are utilized because of the ability to selectively adjust the fitting of the coat 10 and to easily don and remove the coat 10. It is noted that other type of fastening buckles or snaps may alternately be used to selectively secure the protective canine coat 10 to the dog. The securing straps 14a–d thus form a grid over one side of the canine's back. The chest section 11 and straps 14a–d cooperatively define a harness surrounding the animal's torso.

The chest section 11 protects the canine's chest from various injuries. The chest section 11 is made of selected materials to provide the necessary wear resistance, strength and thermal insulation properties for a particular application. Racing sled dogs experience extremely cold temperatures and need protection in various forms and therefore require specific features. For example, female racing dog's nipples require protection from frostbite due to extreme cold. Racing dogs also require protection against snow packing on the chest hair and protection against the effects of sun reflecting off the snow onto the chest and belly. A 500-denier nylon exterior lining with a lightweight insulating interior lining is adequate for protecting racing dogs. However, a hunting dog may require a 1000-denier nylon exterior lining with a quick drying polyolefin fiber insulative inner lining such as PolarFleece™, for providing comfort and greater protection from penetration and frigid water. It can be appreciated by one of ordinary skill in the art that various materials can be substituted for the chest section 11 and the cover 18 in accordance with the teachings of the present invention, to provide different forms of protection.

The lengthwise fasteners 15 are permanently stitched lengthwise to the upper, outer side of the chest section 11. The lengthwise fasteners 15 attach to two pairs of correspondingly oriented receiving fasteners 22 and 24 sewn lengthwise on the underside of cover 18. Again, like the fastener connection between securing strap 14d and the second side portion 13, hook and loop fastener straps are utilized for the lengthwise fasteners 15 and receiving fasteners 22 and 24.

The cover 18 is made of selected materials and dimensioned to differing sizes as predetermined for the function required. Also, the function required dictates how tightly the cover is fitted to the animal. Materials are selected to give a predetermined degree of thermal insulation and solar reflectivity. In one preferred embodiment, the outer material of a reflective cover is made of a highly reflective glossy material, such as aluminum impregnated vinyl or metalized polyester sheet, to provide protection from the sun. A dog sledding dog, such as a husky, exerts large amounts of energy when pulling. The sun causes this type of dog to overheat even during extremely cold days. A highly reflective cover protects the dog from the sun allowing the dog to continue exerting great amounts of energy without overheating. The highly reflective cover also protects the animal at night when walking in and around traffic and allows the animal to be easily seen during the day. For example, if the highly reflective cover is worn on a hunting dog, the hunter can easily seen the animal from long distances away because of the enhanced visibility provided.

Also for this environment, a second pair of receiving fasteners 22 located on the underside of the cover 18 is spaced wider apart than the distance between lengthwise fasteners 15 and strip 20. This differential in the spacing of the receiving hook and loop fastener 22 and strip 20 forces the cover 18 to bend to produce a pocket or tunnel of air between the dog and the cover. The resulting gapping of the cover provides a cooling effect on the dog. Also, for this embodiment, the underside of the cover 18 is nontreated, and essentially nonreflective to avoid trapping heat radiation from the animal.

Extremely cold temperatures and cold water retrieves experienced by hunting dogs require a different type of cover 18. Elastomeric foam such as Neoprene® foamed rubber sheet is a suitable material for use as a cover in the hunting environment due to its heat retention and ability to shed water. It is noted that alternate materials may be used in accordance with the present invention that also provide warming qualities for such applications. Also in cold weather, short-haired or hairless dogs optimally are provided with a cover constructed in accordance with the present invention constructed from a material having a heat absorptive dark exterior coloring and an inner insulating lining such as PolarFleece™ polyolefin fiber. Receiving fastener 24 on the cover is preferably spaced at the same distance or less relative to the spacing of the lengthwise fasteners 15 and strip 20, thus providing a snug fit over the back of the dog for retaining heat.

This adaptability of the position of the cover provides a quick relief from hot or cold environments regardless of the cover being used. It is noted that an important feature of this invention is the ability for the caretaker of the animal to quickly adjust the fit of the cover over the animal, thus adapting the coat and animal to the changing weather. A canine owner may thus alternate between a loose fitting cover 10 during daytime exertions and a tight fitting cover 10 during rest periods. Also, another important feature is the ability for the animal to be easily seen at night while wearing a highly reflective cover.

As shown in FIG. 1 a separate hood 26 may be utilized to provide protection for the canine's upper neck and head. Hood 26 attaches to cover 18 by mating hook and loop fasteners and receiving fasteners. Fasteners are two lengthwise strips attached on the outer lining of the cover 18 at a forward position on the cover 18. Receiving fasteners are two lengthwise strips disposed on the underside of hood 26 and positioned to securely attach to fastener. The forward part of hood 26 is held in place by straps 30. The straps 30 are securely stitched at one end to either side of the hood 26. The free ends of each of the straps 30 have one side of a hook and loop fastener attached thereto. The fasteners on each of the straps attach to each other below the canine's head securing the hood in place. The hood is suitably made of the same material as that used for the cover 18 in order to provide the same desired protection.

As noted previously, chest section 11, cover 18 and hood 26 can be made of the various materials previously mentioned for predetermined climate conditions and applications. Various colors such as fluorescent orange, camouflage or other patterns and various liners unique to the goal desired may also be selected. The coat 10 is also adaptable to function as a harness for pulling a sled. A length of nylon webbing (not shown) can be sewn to the chest section 11, along the centerline of the chest section commencing at a point just in front of the front legs. This webbing would extend backward past the rear end of the coat, terminating in a hook and catch for connection to the harness line of a sled.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An adaptable four legged animal coat, comprising:
   a chest pad with side portions for protecting the underside of the animal without significantly impairing leg movement;
   a cover;
   straps securable to the chest pad on a first side portion of the chest pad and securable to the cover;
   a fastener strap having a first end securable to the cover;
   a first separable fastener means associated with a second end of the fastener strap and a second side portion of the chest pad for securing the cover and the chest pad to the animal; and
   a second separable fastener means associated with the side portions of the chest pad and the underside of the cover for further securing the cover to the chest pad.

2. The coat of claim 1, wherein the first and second separable fastener means comprise hook and loop fasteners.

3. The coat of claim 2, wherein the hook and loop fasteners adjust to animals of various sizes.

4. The coat of claim 1, wherein the chest pad and cover each include an inner and an outer lining which are selected to provide predetermined thermal protection desired for the animal.

5. The coat of claim 1, wherein the chest pad is made of an abrasion resistant protective material.

6. The coat of claim 1, wherein the first separable fastener means associated with the cover is loosely fitted at a first securing position of the second separable fasteners such that the cover loosely fits the animal creating at least one air tunnel between the cover and the animal.

7. The coat of claim 6, wherein the cover is made of a highly reflective outer material for enhancing animal visibility during the day and night and keeping the animal cool by reflecting the sun.

8. The coat of claim 1, wherein the cover is snugly fitted at a second securing position of the second separable fasteners.

9. The coat of claim 8, wherein the cover is made of a sun absorbing, heat containing material for keeping the animal warm.

10. The coat of claim 1, further comprising a hood selectively securable to the cover to shield the animal's head.

11. A coat for a four legged animal adaptable to differing environmental conditions, comprising:
    a harness securable around the animal's torso and self supporting thereon;
    a cover secured to the harness and dimensioned to shield the animal's backside;
    first and second fasteners disposed on the cover; and
    third fasteners disposed on the harness and selectively mateable to the first and second fasteners to further secure the cover to the harness, wherein the first fasteners on the cover are offset relative to the third fasteners on the harness such that the cover can loosely fit the animal creating at least one air tunnel between the cover and the animal.

12. The coat of claim 11, wherein the harness comprises:
    a chest pad for covering the animal's underside; and
    a plurality of straps capable of spanning across the animal's backside and attachable at one end to a first side of the chest pad and at the other end to the cover and at least one of the plurality of straps extending to be attachable to a second side of the chest pad.

13. The coat of claim 12, further comprising strap fastener means for selectively attaching the at least one of the plurality of straps to the chest pad.

14. The coat of claim 11, wherein the first and second fasteners on the cover comprise strips of hook and loop fastener material and the third fasteners on the harness comprise mating strips of hook and loop fastener material.

15. The coat of claim 11, wherein the cover includes a light reflective outer material, for enhancing animal visibility during the day and night and keeping the animal cool by reflecting the sun.

16. The coat of claim 15, wherein the cover is selectively adjustable between a loose fit for cooling and a snug fit for warmth and weather resistance.

17. An adaptable four legged animal coat, comprising:
    a chest pad with side portions for protecting the underside of the animal without significantly impairing leg movement;
    a cover, wherein the cover is made of a highly reflective outer material for enhancing animal visibility during the day and night and keeping the animal cool by reflecting the sun;
    straps securable to the chest pad on a first side portion of the chest pad and securable to the cover;
    a fastener strap having a first end securable to the cover;
    a first separable fastener means associated with a second end of the fastener strap and a second side portion of the chest pad for securing the cover and the chest pad to the animal; and
    a second separable fastener means associated with the side portions of the chest pad and the underside of the cover for further securing the cover to the chest pad.

* * * * *